US012632352B2

(12) United States Patent \
Doshi et al.

(10) Patent No.: US 12,632,352 B2 \
(45) Date of Patent: May 19, 2026

(54) DYNAMIC CPU ALLOCATION ON FAILOVER

(71) Applicant: Rakuten Symphony, Inc., Tokyo (JP)

(72) Inventors: Tushar Anil Doshi, Santa Clara, CA (US); Arumugam Nallasivam, Bangalore (IN); Ashok Kumar Mishra, San Jose, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/249,892

(22) PCT Filed: Dec. 13, 2022

(86) PCT No.: PCT/US2022/052729

§ 371 (c)(1), \
(2) Date: Apr. 20, 2023

(87) PCT Pub. No.: WO2024/129068

PCT Pub. Date: Jun. 20, 2024

(65) Prior Publication Data

US 2025/0298705 A1 Sep. 25, 2025

(51) Int. Cl.
*G06F 11/20* (2006.01)
*G06F 11/14* (2026.01)
*G06F 11/1482* (2026.01)

(52) U.S. Cl.
CPC ........ *G06F 11/203* (2013.01); *G06F 11/1484* (2013.01); *G06F 11/2035* (2013.01); *G06F 2201/85* (2013.01)

(58) Field of Classification Search
CPC .............. G06F 11/1484; G06F 11/203; G06F 11/2035; G06F 2201/85; G06F 2009/4557; G06F 11/2025; G06F 11/2028
See application file for complete search history.

(56) References Cited

U.S. PATENT DOCUMENTS

| | | | |
|---|---|---|---|
| 7,290,260 B2 | 10/2007 | Miller | |
| 8,458,390 B2 | 6/2013 | Mehrotra | |
| 9,141,435 B2 | 9/2015 | Wein | |
| 9,996,440 B2 | 6/2018 | Ganesan | |
| 10,129,169 B2 | 11/2018 | Mahindru | |
| 10,534,542 B2 | 1/2020 | Trehan | |
| 10,824,455 B2 | 11/2020 | Arikatla | |
| 11,294,782 B1 * | 4/2022 | Charles | G06F 11/3495 |
| 2012/0297236 A1 * | 11/2012 | Ziskind | G06F 9/455 |
| | | | 714/E11.132 |

(Continued)

FOREIGN PATENT DOCUMENTS

JP 3884427 B2 2/2007

*Primary Examiner* — Ashish Thomas \
*Assistant Examiner* — Albert Li \
(74) *Attorney, Agent, or Firm* — David R. Stevens; Stevens Law Group

(57) ABSTRACT

Upon failure of a host and, in response to a lack of hots having available processing units, a host is selected and one or more processing units of the selected host are allocated as shared CPUs for use by one or more components of the failed host. The selected host may be selected according to requirements, such as affinity, anti-affinity, and latency. The shared CPUs may have been previously allocated as a dedicated CPU. The shared CPUs may be bound to the one or more components. The one or more components may include a container.

18 Claims, 7 Drawing Sheets

(56) References Cited

U.S. PATENT DOCUMENTS

2015/0040131 A1* 2/2015 Shan ..................... G06F 9/5077
                                                    718/1
2015/0058861 A1* 2/2015 Zheng ....................... G06F 9/50
                                                    718/104
2017/0257275 A1   9/2017 Atyam et al.
2018/0165166 A1   6/2018 Wang
2019/0108106 A1   4/2019 Aggarwal
2019/0370135 A1* 12/2019 Salapura ............. G06F 11/2097
2020/0151018 A1*  5/2020 Jha ........................ G06F 9/4856
2020/0280566 A1   9/2020 Raj et al.
2020/0379907 A1  12/2020 Rostykus et al.
2021/0200814 A1   7/2021 Tal et al.
2021/0326165 A1* 10/2021 Shibayama ........... G06F 3/0644
2021/0373956 A1* 12/2021 Krasner ................ G06F 9/5027
2021/0398243 A1  12/2021 Shah et al.
2023/0289208 A1*  9/2023 Hildebrand .......... G06F 9/5022

* cited by examiner

DYNAMIC CPU ALLOCATION ON FAILOVER

BACKGROUND

Field of the Invention

This invention relates to dynamic CPU allocation.

Background of the Invention

Containers are a convenient way to execute application instances in a variety of operating environments. A container is software that packages all dependencies of an application instance so that the application instance executes reliably and quickly in any given computing environment. For example, a container may include executable code, runtime, system tools, system libraries, settings, and the like that enable an application instance to execute on a host either with or without an underlying operating system.

A container may be allocated computing resources by a pod providing a logical host to the container and one or more other containers. In particular, in order to provide a degree of performance, stability, and security, one or more central processing unit (CPU) of a host including many CPUs may be allocated to a container.

It would be an advancement in the art to provide greater flexibility in the allocation of CPUs to containers.

SUMMARY OF THE INVENTION

An apparatus includes a computing device including one or more processing devices and one or more memory devices operably coupled to a plurality of processing devices. The one or more memory devices storing executable code that, when executed by the one or more processing devices, causes the one or more processing devices to detect that a plurality of hosts lack processing units available for allocation. In response to detecting that the plurality of hosts lack processing units available for allocation, a selected host is selected from the plurality of hosts. Instantiation of a component using one or more previously-allocated processing units of the selected host is invoked.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
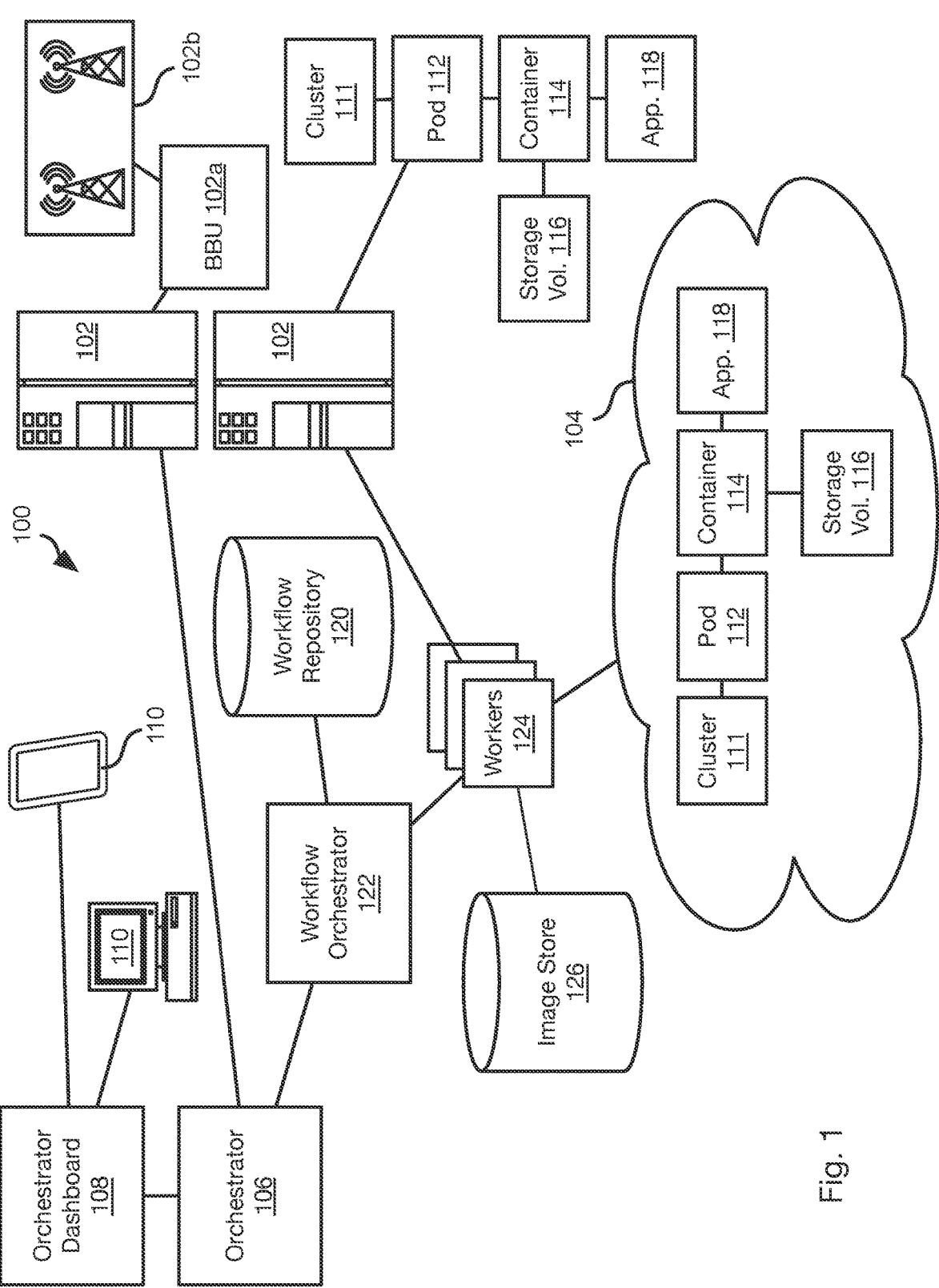
FIG. 1 is a schematic block diagram of a network environment in which containers may be deployed in accordance with an embodiment.

FIG. 1 illustrates an example network environment 100 in which the systems and methods disclosed herein may be used. The components of the network environment 100 may be connected to one another by a network such as a local area network (LAN), wide area network (WAN), the Internet, a backplane of a chassis, or other type of network. The components of the network environment 100 may be connected by wired or wireless network connections. The network environment 100 includes a plurality of servers 102. Each of the servers 102 may include one or more computing devices, such as a computing device having some or all of the attributes of the computing device 600 of FIG. 6.

Computing resources may also be allocated and utilized within a cloud computing platform 104, such as amazon web services (AWS), GOOGLE CLOUD, AZURE, or other cloud computing platform. Cloud computing resources may include purchased physical storage, processor time, memory, and/or networking bandwidth in units designated by the provider by the cloud computing platform.

In some embodiments, some or all of the servers 102 may function as edge servers in a telecommunication network. For example, some or all of the servers 102 may be coupled to baseband units (BBU) 102a that provide translation between radio frequency signals output and received by antennas 102b and digital data transmitted and received by the servers 102. For example, each BBU 102a may perform this translation according to a cellular wireless data protocol (e.g., 4G, 5G, etc.). Servers 102 that function as edge servers may have limited computational resources or may be heavily loaded.

An orchestrator 106 provisions computing resources to application instances 118 of one or more different application executables, such as according to a manifest that defines requirements of computing resources for each application instance. The manifest may define dynamic requirements defining the scaling up or scaling down of a number of application instances 118 and corresponding computing resources in response to usage. The orchestrator 106 may include or cooperate with a utility such as KUBERNETES to perform dynamic scaling up and scaling down the number of application instances 118.

An orchestrator 106 may execute on a computer system that is distinct from the servers 102 and is connected to the servers 102 by a network that requires the use of a destination address for communication, such as using a networking including ethernet protocol, internet protocol (IP), Fibre Channel, or other protocol, including any higher-level protocols built on the previously-mentioned protocols, such as user datagram protocol (UDP), transport control protocol (TCP), or the like.

The orchestrator 106 may cooperate with the servers 102 to initialize and configure the servers 102. For example, each server 102 may cooperate with the orchestrator 106 to obtain a gateway address to use for outbound communication and a source address assigned to the server 102 for use in inbound communication. The server 102 may cooperate with the orchestrator 106 to install an operating system on the server 102. For example, the gateway address and source address may be provided and the operating system installed using the approach described in U.S. application Ser. No. 16/903,266, filed Jun. 16, 2020 and entitled AUTOMATED INITIALIZATION OF SERVERS, which is hereby incorporated herein by reference in its entirety.

The orchestrator 106 may be accessible by way of an orchestrator dashboard 108. The orchestrator dashboard 108 may be implemented as a web server or other server-side application that is accessible by way of a browser or client application executing on a user computing device 110, such as a desktop computer, laptop computer, mobile phone, tablet computer, or other computing device.

The orchestrator 106 may cooperate with the servers 102 in order to provision computing resources of the servers 102 and instantiate components of a distributed computing system on the servers 102 and/or on the cloud computing platform 104. For example, the orchestrator 106 may ingest a manifest defining the provisioning of computing resources to, and the instantiation of, components such as a cluster 111, pod 112 (e.g., KUBERNETES pod), container 114 (e.g., DOCKER container), storage volume 116, and an application instance 118. The orchestrator may then allocate computing resources and instantiate the components according to the manifest.

The manifest may define requirements such as network latency requirements, affinity requirements (same node, same chassis, same rack, same data center, same cloud region, etc.), anti-affinity requirements (different node, different chassis, different rack, different data center, different cloud region, etc.), as well as minimum provisioning requirements (number of cores, amount of memory, etc.), performance or quality of service (QoS) requirements, or other constraints. The orchestrator 106 may therefore provision computing resources in order to satisfy or approximately satisfy the requirements of the manifest.

The instantiation of components and the management of the components may be implemented by means of workflows. A workflow is a series of tasks, executables, configuration, parameters, and other computing functions that are predefined and stored in a workflow repository 120. A workflow may be defined to instantiate each type of component (cluster 111, pod 112, container 114, storage volume 116, application instance, etc.), monitor the performance of each type of component, repair each type of component, upgrade each type of component, replace each type of component, copy (snapshot, backup, etc.) and restore from a copy each type of component, and other tasks. Some or all of the tasks performed by a workflow may be implemented using KUBERNETES or other utility for performing some or all of the tasks.

The orchestrator 106 may instruct a workflow orchestrator 122 to perform a task with respect to a component. In response, the workflow orchestrator 122 retrieves the workflow from the workflow repository 120 corresponding to the task (e.g., the type of task (instantiate, monitor, upgrade, replace, copy, restore, etc.) and the type of component. The workflow orchestrator 122 then selects a worker 124 from a worker pool and instructs the worker 124 to implement the workflow with respect to a server 102 or the cloud computing platform 104. The instruction from the orchestrator 106 may specify a particular server 102, cloud region or cloud provider, or other location for performing the workflow. The worker 124, which may be a container, then implements the functions of the workflow with respect to the location instructed by the orchestrator 106. In some implementations, the worker 124 may also perform the tasks of retrieving a workflow from the workflow repository 120 as instructed by the workflow orchestrator 122. The workflow orchestrator 122 and/or the workers 124 may retrieve executable images for instantiating components from an image store 126.

Figure 2:
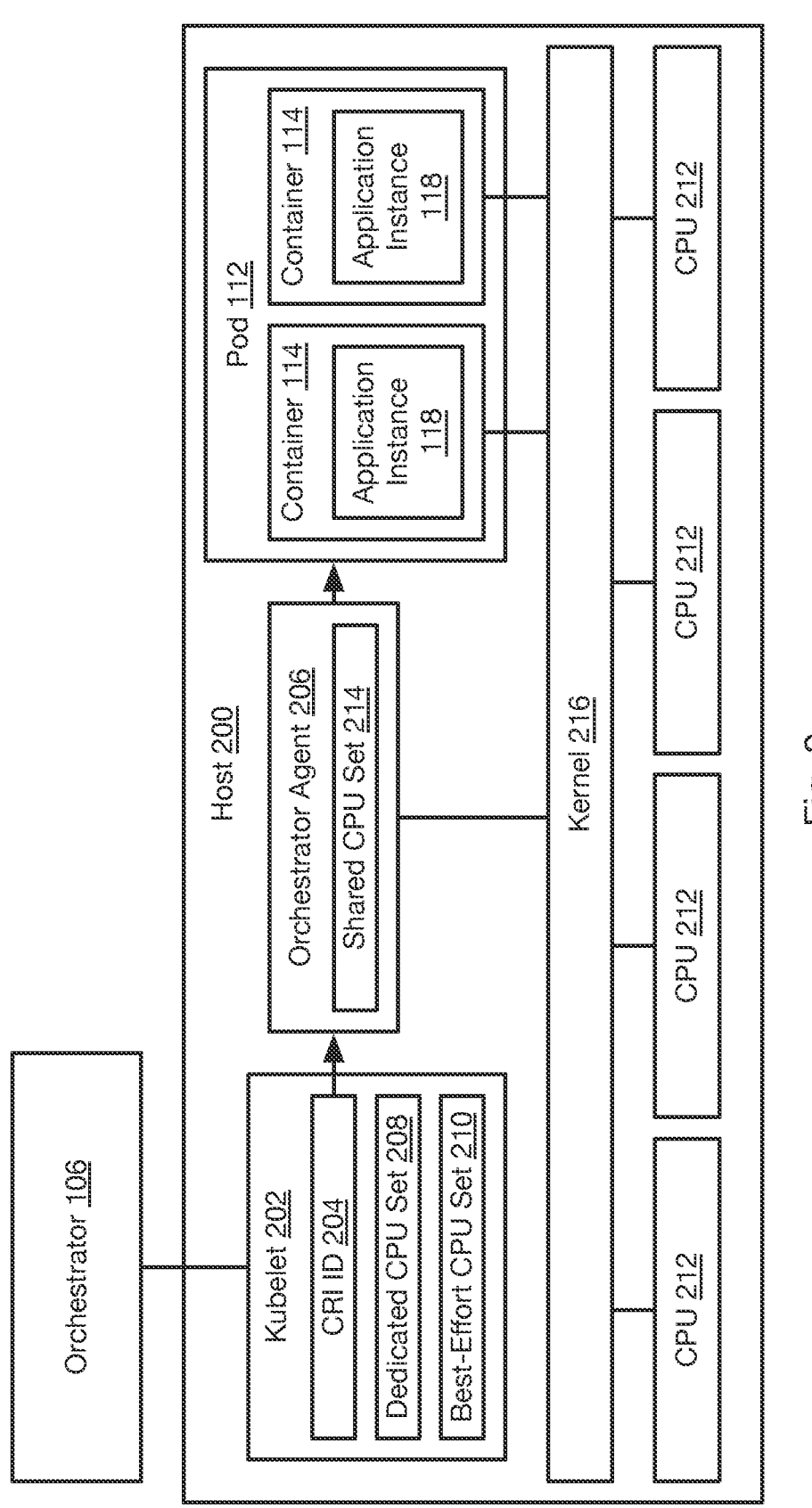
FIG. 2 is a schematic block diagram showing components for allocating CPUs in accordance with an embodiment.

Referring to FIG. 2, a host 200 may be a server 102, a unit of computing resources on the cloud computing platform 104, a virtual machine, or other computing device. A Kubelet 202 may execute on the host 200. The Kubelet 202 may implement a pod 112 on the host 200 and manage containers 114 and corresponding application instances 118 executing on the host 200. The Kubelet 202, and the pod 112 implemented by the Kubelet 202, may function as a logical host for multiple containers 114. The pod 112 may include a set of namespaces, a file system (e.g., built on a storage volume 116), or other data structures that are shared by containers 114 belonging to the pod 112.

The Kubelet 202 may be configured with a container runtime interface (CRI) identifier 204 that refers to an orchestrator agent 206 that is an agent of the orchestrator 106 and may communicate with the orchestrator 106 in order to perform the functions ascribed herein to the orchestrator agent 206. The Kubelet 202 may call the orchestrator agent 206 as a CRI to perform tasks with respect to containers 114 instantiated in the pod 112, such as to instantiate containers 114, suspend containers 114, de-instantiate containers 114, monitor the status of containers 114, monitor usage of computing resources by the containers 114, and other tasks. The orchestrator 106 performs tasks as instructed by the Kubelet 202 and performs additional functions in order to extend the functionality of the pod 112 and containers 114 beyond that provided by conventional KUBERNETES.

The Kubelet 202 may maintain a dedicated CPU set 208 and a best-effort CPU set 210. The sets 208, 210 are used by the Kubelet 202 to determine whether a CPU 212 is available for allocation or not. For example, once the number of CPUs included in the sets 208, 210 is equal to the total number of CPUs 212, then no further CPUs will be allocated by the Kubelet 202. The host 200 includes a plurality of CPUs 212 that may be referenced in either the dedicated CPU set 208, the best-effort CPU set 210, or remain unallocated. The Kubelet 202 may allocate the CPUs to one of the sets 208, 210 by means of the orchestrator agent 206, which may coordinate with the kernel 216 (or other software component) of the host 200 in order to bind CPUs 212 to a particular container 114 or group of containers. As used herein "CPU" may refer to an entire CPU chip including multiple cores, an individual processing core of a multi-core chip, a logical unit of processing defined by the cloud computing platform 104, or other processing device.

The CPUs 212 assigned to the dedicated CPU set 208 are available for use only by the container to which the CPUs 212 are allocated. Accordingly, the CPU set 208 may include entries including a container identifier corresponding to a container 114 and one or more CPU identifiers corresponding to the one or more CPUs 212 allocated to the container 114.

The CPUs 212 assigned to the best-effort CPU set 210 are available for use by any container 114 as well as other processes executing on the host 200, such as the Kubelet 202, orchestrator agent 206, the kernel 216, an operating system, or other processes or services implemented on the host 200. Processing time of the CPUs 212 in the best-effort CPU set may be allocated on a round-robin fashion, based on priorities, or any other criteria known in the art for sharing processing time among a plurality of processes. The best-effort CPU set 210 may include a listing of the identifiers of CPUs 212 assigned to the best-effort CPU set 210.

In KUBERNETES, the Kubelet 202 will process a request for allocating one or more CPUs to be shared by multiple containers 114 by simply adding references to the one or more CPUs to the best-effort CPU set 210. The multiple containers 114 are therefore not guaranteed allocation of the one or more CPUs.

When requesting that one or more CPUs 212 be dedicated to multiple containers ("dedicated shared CPUs"), the orchestrator 106 may include an annotation in a container specification passed to the Kubelet 202. The annotation may indicate a number of dedicated shared CPUs to allocate to two or more containers 114, such as those associated with container identifiers included in the annotation or he container specification. The annotation is not implemented by the Kubelet 202 but is passed by the Kubelet to the orchestrator agent 206 when called by the Kubelet 202 as the CRI to implement the container specification. The number of dedicated shared CPUs in the annotation may be the same as the number of shared CPUs in the container specification other than the annotation. The Kubelet 202 will therefore add that number of shared CPUs to the best-effort CPU set.

However, the orchestrator agent 206 will receive the annotation and add the same number of CPUs to a shared CPU set 214 maintained by the orchestrator agent 206 independent from the Kubelet 202. For example, the shared CPU set 214 may include entries that each include a listing of one or more identifiers of one or more CPUs 212 and a listing of two or more container identifiers of containers 114 for which the one or more CPUs 212 are dedicated shared CPUs. The orchestrator agent 206 will further cause the kernel 216 to bind the one or more CPUs to the two or more containers 114 such that the one or more CPUs are dedicated to the two or more containers 114 while being usable by any of the two or more containers 114.

Figure 3A:
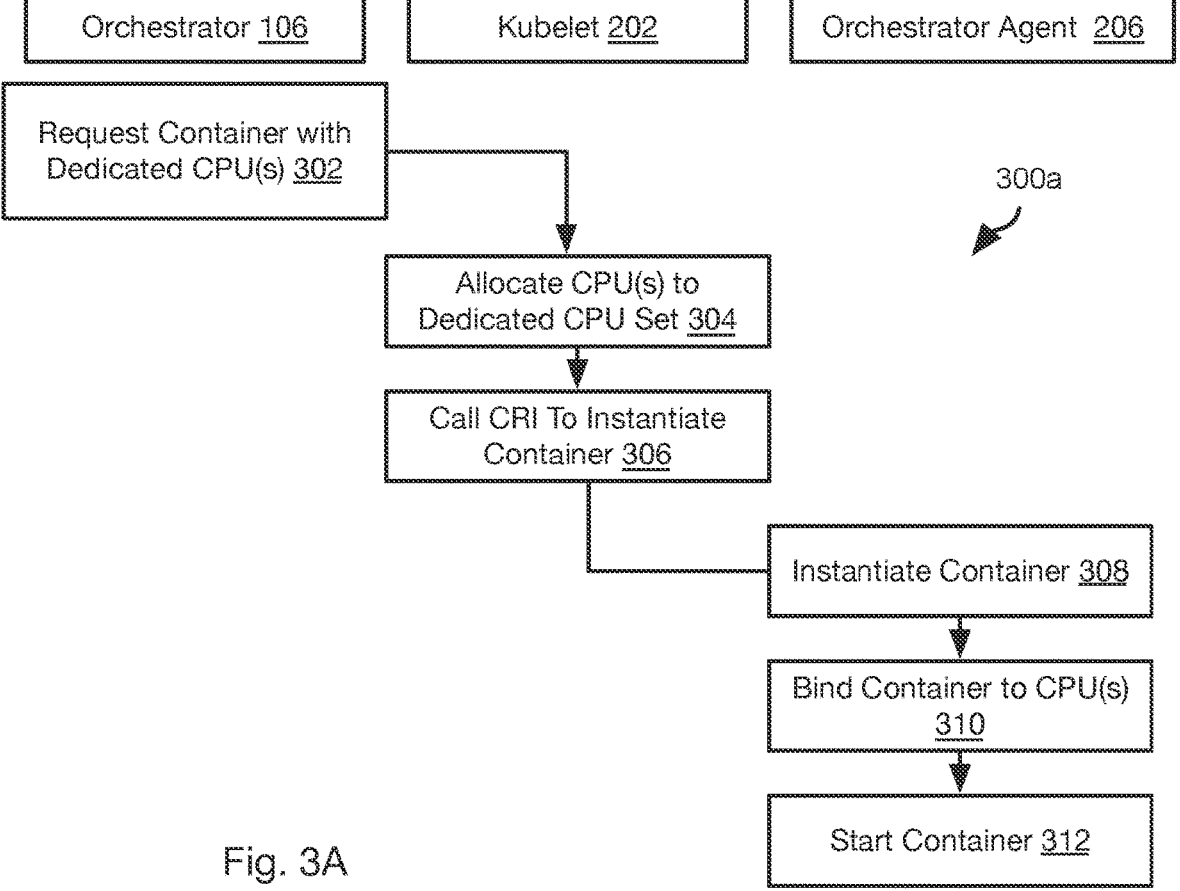
FIG. 3A is a process flow diagram of a method for allocating dedicated CPUs in accordance with an embodiment.
Figure 3B:
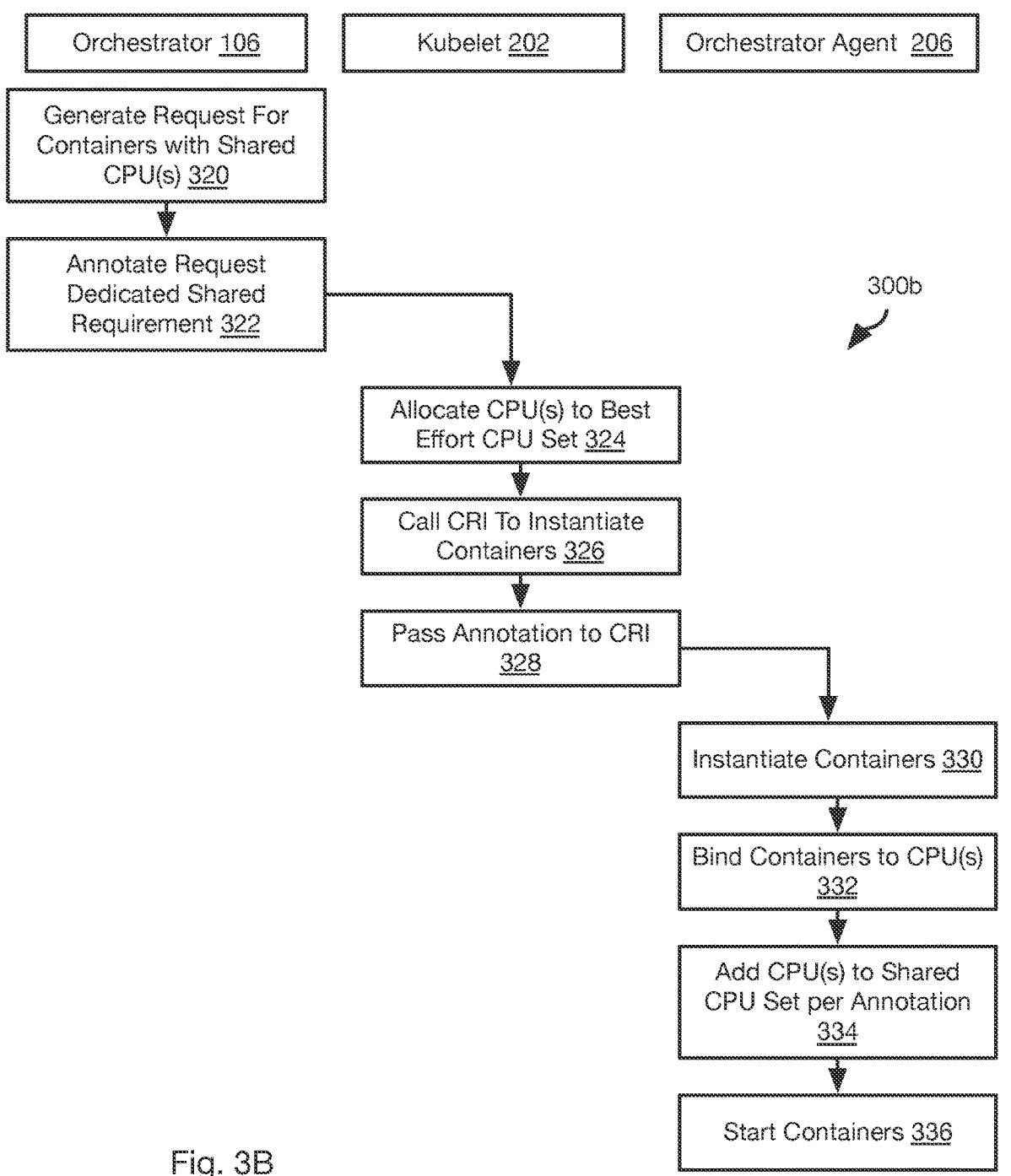
FIG. 3B is a process flow diagram of a method for allocating dedicated shared CPUs in accordance with an embodiment.

FIG. 3A illustrates a method 300a for instantiating a container with one or more dedicated CPUs. FIG. 3B illustrates a method 300b for instantiating two or more containers with dedicated shared CPUs.

Referring specifically to FIG. 3A, the method 300a may include the orchestrator 106 requesting 302 instantiation of a container 114 with a number of dedicated CPUs, i.e., a number from one to the total number of available CPUs that have not been previously allocated. The request may be in the form of a container specification including the number of dedicated CPUs and other parameters for instantiating the container 114. The Kubelet 202 receives the request and allocates 304 the number of CPUs, i.e., adds identifiers of the number of CPUs 212 to the dedicated CPU set 208 either with or without an association to an identifier of the container 114 to be instantiated. Allocating 304 the number of CPUs may include decrementing a number of available CPUs of the CPUs 212 by the number of dedicated CPUs in the request.

The Kubelet 202 further calls 306 the CRI, i.e., orchestrator agent 206, to instantiate the container 114. The Kubelet 202 may pass the number of dedicated CPUs to the orchestrator agent 206 along with any other parameters included in the request. The orchestrator agent 206 instantiates 308 the container 114 and binds 310 the container to the number of dedicated CPUs in the request. The orchestrator agent 206 may then start 312 execution of the container 114 and perform any other tasks required for the proper functioning of the container 114. The container 114 will then commence executing on the one or more CPUs bound to the container 114 at step 310. The container 114 may therefore commence execution of the application instances 118 of the container 114.

FIG. 3B illustrates a method 300b for instantiating two or more containers 114 with one or more dedicated shared CPUs that are usable only by the two or more containers 114. The method 300a may include the orchestrator 106 generating 320 a request for instantiation of a container 114 with a number of shared CPUs, i.e., a number from one to the total number of available CPUs that have not been previously allocated. The request may be in the form of a container specification including the number of shared CPUs and other parameters for instantiating the two or more containers 114. The orchestrator 106 further annotates 322 the request with an indication that the shared CPUs are to be dedicated shared CPUs for use by only the two or more containers 114.

The Kubelet 202 receives the annotated request and allocates 324 the number of CPUs, i.e., adds the number of CPUs to the best-effort CPU set 210. The Kubelet may also add identifiers of the CPUs 212 to the best-effort CPU set 210 either with or without an association with identifiers of the two or more containers 114 to be instantiated. Allocating 324 the number of CPUs may include decrementing a number of available CPUs of the CPUs 212 by the number of CPUs from the request.

The Kubelet 202 further calls 326 the CRI, i.e., orchestrator agent 206, to instantiate the two or more containers 114. As part of calling 326 the CRI, or in a separate action, the Kubelet passes 328 the annotation to the orchestrator agent 206 along with other parameters included in the request. Since the Kubelet 202 interprets the request for one or more shared CPUs by simply adding the one or more shared CPUs to the best-effort CPU set 210, the Kubelet 202 may or may not pass the number of shared CPUs from the request to the orchestrator agent 206 since the Kubelet's interpretation of the request does not require binding of the two or more containers to a particular CPU 212.

The orchestrator agent 206 instantiates 330 the two or more containers 114 and binds 332 the two or more containers 114 to one or more CPUs 212 in number equal to the number of shared CPUs specified in the request at step 320. The binding of step 332 may include binding each container 114 to each of the one or more shared CPUs 212 such that each container 114 may use each CPU 212 of the one or more shared CPUs 212. Thus, the one or more shared CPUs 212 bound to the two or more containers 114 become one or more dedicated shared CPUs 212 and are no longer part of the best-effort CPU set. The one or more dedicated shared CPUs 212 are therefore no longer available to execute an operating system or other processes that are not bound to one or more specific CPUs 212. The one or more dedicated shared CPUs 212 bound at step 332 may be selected from CPUs 212 referenced in the best-effort CPU set 210 and may include the CPUs 212 added to the best-effort CPU set at step 324.

The orchestrator agent 206 further adds 334 the number of dedicated shared CPUs 212 to the shared CPU set 214. Adding 334 the number of dedicated shared CPUs 212 to the shared CPU set 214 may include incrementing the number of CPUs in the shared CPU set 214. Step 334 may include adding an entry mapping identifiers of the two or more containers 114 to one or more identifiers of the one or more dedicated shared CPUs 212.

The orchestrator agent 206 may then start 336 execution of the two or more containers 114 and perform any other tasks required for the proper functioning of the wo or more containers 114. The two or more container 114 will then commence executing on the one or more CPUs bound to the two or more containers 114 at step 332. The two or more containers 114 may commence execution of the application instances 118 of the two or more containers 114.

In an alternative or additional approach to the method 300*b*, the containers 114 that are to share one or more dedicated shared CPUs 212 may be instantiated in separate iterations of the method 300*b*, such as one at a time. Accordingly, a single container 114 is instantiated 330 and bound 332 to the one or more shared CPUs 212.

One or more additional containers 114 may then be instantiated according to the method 300*b* except that step 324 will not be repeated. For example, for the one or more additional containers 114, the annotation from step 322 may specify that the one or more additional containers 114 are to be bound to one or more dedicated shared CPUs 212 from a previous iteration of the method 300*b*.

Figure 4:
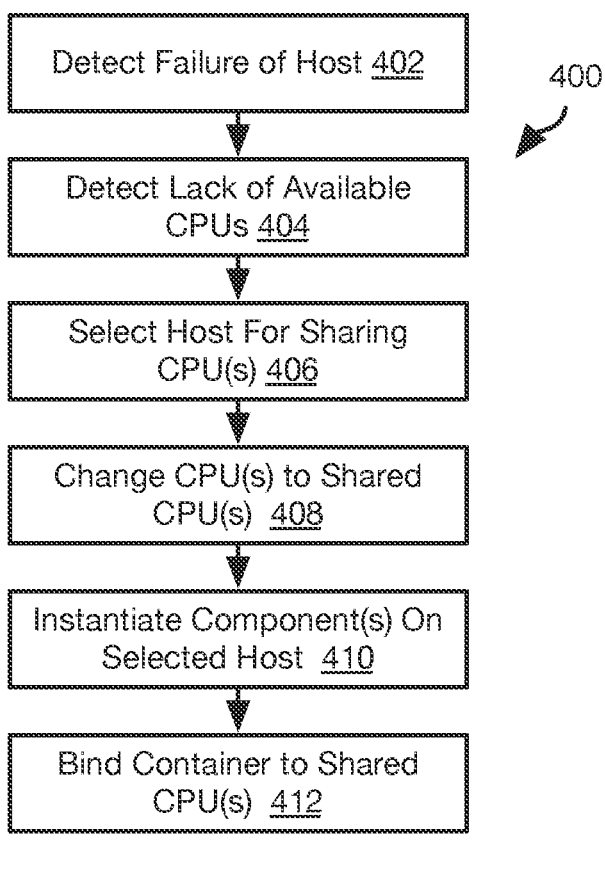
FIG. 4 is a process flow diagram of a method for dynamically allocating a CPU for executing an application on failover in accordance with an embodiment.
Figure 5:
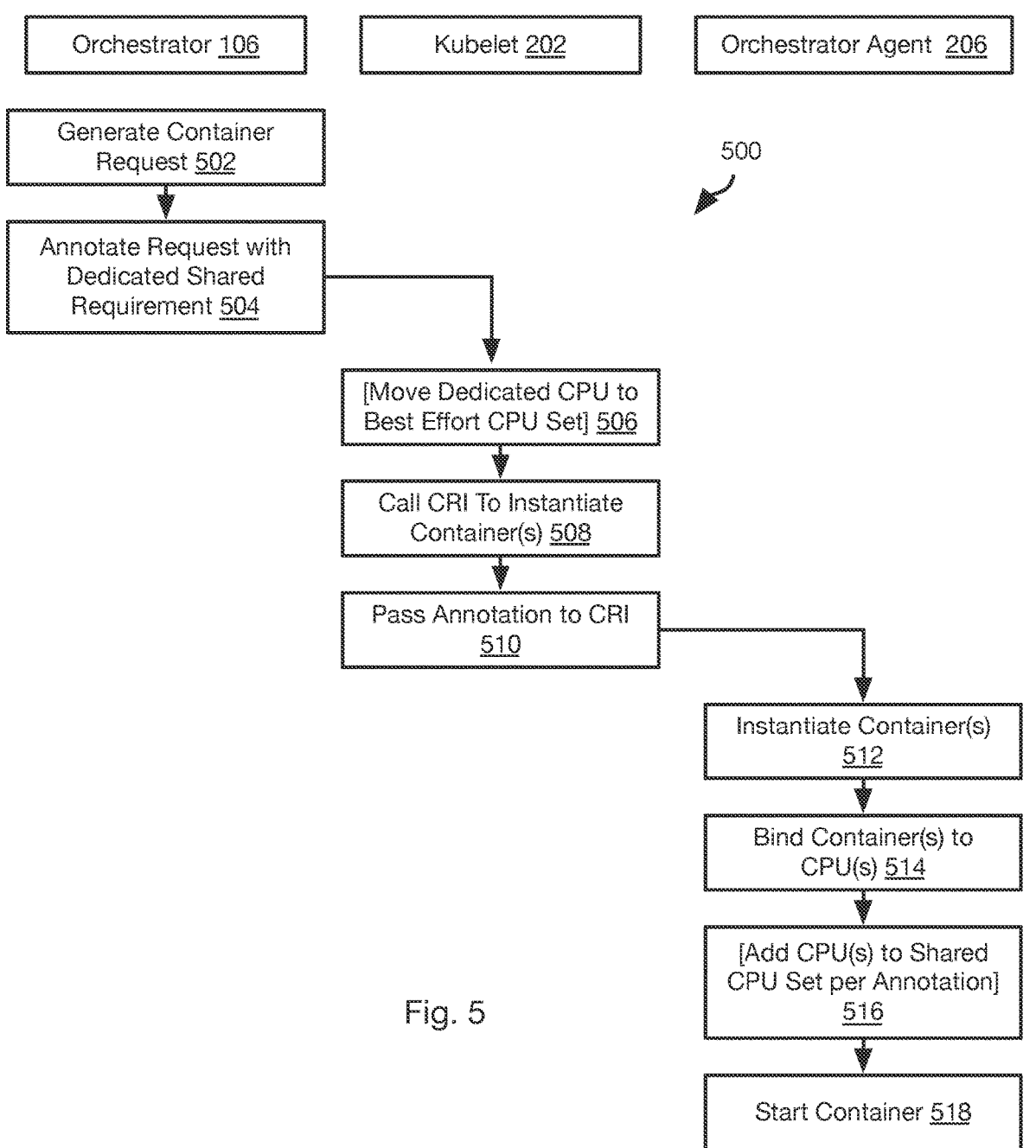
FIG. 5 is a process flow diagram illustrating processing on a substitute host to dynamically allocate CPUs on failover in accordance with an embodiment.

Referring to FIGS. 4 and 5, in some scenarios, a host 200 may fail. Any pods 112, containers 114, application instances 118, and possibly storage volumes 116 of the host 200 may therefore need to be re-instantiated on another host 200. However, in some scenarios, there is no host 200 with CPUs available that are not already dedicated to executing one or more other containers 114 and application instances 118. The methods 400 and 500 of FIGS. 4 and 5 may therefore be executed to perform failover with the dynamic re-allocation of currently-allocated CPUs.

Referring specifically to FIG. 4, The illustrated method 400 may be performed by the orchestrator 106, a workflow invoked by the orchestrator 106 and executed by a worker 124, or some other component.

The method 400 may include detecting 402 failure of a host 200 ("the failed host") executing one or more containers and one or more corresponding application instances 118 that will need to be relocated ("the relocated components"). Detecting 402 failure of the host 200 may include the host 200 failing a periodic health check performed by the orchestrator 106 or a workflow invoked by the orchestrator 106. Detecting 402 failure may include a time passed since a heartbeat message was received from the host 200 exceeding a maximum threshold. Detecting 402 failure may include failing to receive a response to a request within a timeout period. Detecting 402 failure may include detecting failure of a network connection to the host 200.

The method 400 may include detecting 404 a lack of available CPUs that are not already dedicated to other containers 114 or to other processes. For example, the orchestrator 106 may maintain an inventory of CPUs on each host 200. Each time a CPU is dedicated on a host 200, the host 200 may so indicate to the orchestrator 106, which then updates the inventory. Accordingly, step 404 may include detecting that the inventory does not include any non-dedicated CPUs. Note that each host 200 may require a certain number of best effort CPUs to execute an operating system or other processes of the host 200. Accordingly, a certain number of CPUs may be excluded from consideration when detecting 404 whether any CPUs are not already dedicated. Note that if there are CPUs available to be allocated, then the method 400 may end and the containers 114 and pods 112 of the failed host may be re-instantiated on a host 200 with available CPUs.

The method 400 may include selecting 406 a new host 200 for the relocated components ("the substitute host"). The substitute host may be executed based on one or more criteria. The substitute host may be least loaded in terms of memory, processor, time, networking data transmission, or other measure of loading. The substitute host 200 may be selected based on criticality: the substitute host may be the host with the least number of components dependent on the components executing on the substitute host. Dependencies may be in the form of another component having a network connection, application session, or other relationship to one of the relocated components. A dependency may include another component having one or more environmental variables referencing one of the relocated components. A dependency may be indirect: a component that is dependent on a component that is dependent on one of the relocated components may also be deemed dependent on one of the relocated components.

The substitute host may be selected based on one or more requirements such as an affinity requirement, anti-affinity requirement, or other criteria. An affinity requirement may specify that the relocated components have a required degree of proximity to one or more other components: same server, same chassis, same server rack, same data center, same cloud region, etc. An anti-affinity requirement may specify that the relocated components have a required degree of distance relative to one or more other components: different server, different chassis, different server rack, different data center, different cloud region, etc. A latency requirement may specify a maximum permitted latency between one or more of the relocated components and one or more other components.

There may be multiple relocated components such that multiple substitute hosts may be selected for each component of the relocated components. In the following description, instantiation of a component on a substitute host is described with the understanding that this process may be performed for each relocated component and the corresponding substitute host selected for each relocated components. In addition, multiple relocated components may be instantiated on the same substitute host in a like manner.

The method 400 may include changing 408 one or more dedicated CPUs on the substitute host to shared CPUs. The CPUs selected to be changed 408 may be selected as being dedicated to a component having the least number of components dependent thereon, such as dependent as defined above with respect to step 406. The CPUs selected to be changed 408 may be selected as being the least utilized, e.g., least fraction of processing cycles used. Changing 408 one or more dedicated CPUs on the substitute host may include changing 408 one or more dedicated shared CPUs as described above to be additionally shared with one or more of the relocated components.

Changing 408 one or more dedicated CPUs on the substitute host may include adding one or more dedicated shared CPUs to the best effort set 210 followed by changing the CPUs to dedicated shared CPUs as described below with respect to FIG. 4.

The method 400 may include instantiating 410 the one or more relocated components on the substitute host and binding 412 the one or more relocated components to the CPUs changed at step 408. Instantiating 410 the one or more relocated component may include configuring the one or more components to function on the substitute host, such as establishing application sessions, network connections, or other relationships to other components of a cluster 111. Instantiating 410 may include configuring other components to use one or more new address of the one or more relocated components.

FIG. 5 illustrates an example method for dynamically allocating a shared CPU to a relocated component embodied as a container 114 executing an application instance 118 ("the relocated container"). The orchestrator 106 may generate 502 a container request requesting instantiation of the relocated container, which includes the application instance 118. The request may specify a number of shared CPUs, i.e., the number of CPUs selected for changing at step 408. The request may be in the form of a container specification including the number of shared CPUs and other parameters for instantiating the container 114. The orchestrator 106 further annotates 504 the request with an indication that the shared CPUs are to be dedicated shared CPUs for use by the relocated container one or more containers for which the dedicated shared CPUs were previously dedicated ("the one or more current containers") according to the method 300*a* or the method 300*b*.

The Kubelet 202 receives the annotated request. If the CPUs referenced by the request are currently dedicated or dedicated shared CPUs, the method 500 may include moving 506 the CPUs to the best effort CPU set 210 (e.g., if the CPUs were in the dedicated CPU set 208). If the CPUs are already in the best effort CPU set 210, then no action is taken (e.g., if the CPUs are already dedicated shared CPUs). Where CPUs are moved 506, the Kubelet may also add identifiers of the CPUs 212 that were moved to the best-effort CPU set 210 either with or without an association with an identifier of the relocated container.

The Kubelet 202 further calls 508 the CRI, i.e., orchestrator agent 206, to instantiate the relocated container. As part of calling 508 the CRI, or in a separate action, the Kubelet passes 510 the annotation to the orchestrator agent 206 along with other parameters included in the request. Since the Kubelet 202 interprets the request for one or more shared CPUs by simply adding the one or more shared CPUs to the best-effort CPU set 210, the Kubelet 202 may or may not pass the number of shared CPUs from the request to the orchestrator agent 206 since the Kubelet's interpretation of the request does not require binding of the two or more containers to a particular CPU 212.

The orchestrator agent 206 instantiates 512 the relocated container, which includes instantiating the application instance 118 of the relocated container, and binds 514 the relocated container to one or more CPUs 212 in number equal to the number of shared CPUs specified in the request at step 502. The binding of step 514 may include binding the relocated container to each of the one or more shared CPUs 212 such that the relocated container and the one or more current containers may all use the one or more shared CPUs 212.

Where the CPUs 212 to which the relocated container is bound were previously dedicated CPUs to a single current container, the orchestrator agent 206 further adds 516 the number of dedicated shared CPUs 212 to the shared CPU set 214. Adding 516 the number of dedicated shared CPUs 212 to the shared CPU set 214 may include incrementing the number of CPUs in the shared CPU set 214. Step 516 may include adding an entry mapping an identifier of the relocated container to one or more identifiers of the one or more dedicated shared CPUs 212.

The orchestrator agent 206 may then start 518 execution of the relocated container and perform any other tasks required for the proper functioning of the relocated container. The relocated container will then commence executing on the one or more CPUs bound to the relocated container at step 514. The relocated container may then commence execution of the application instance 118 of the relocated container.

Figure 6:
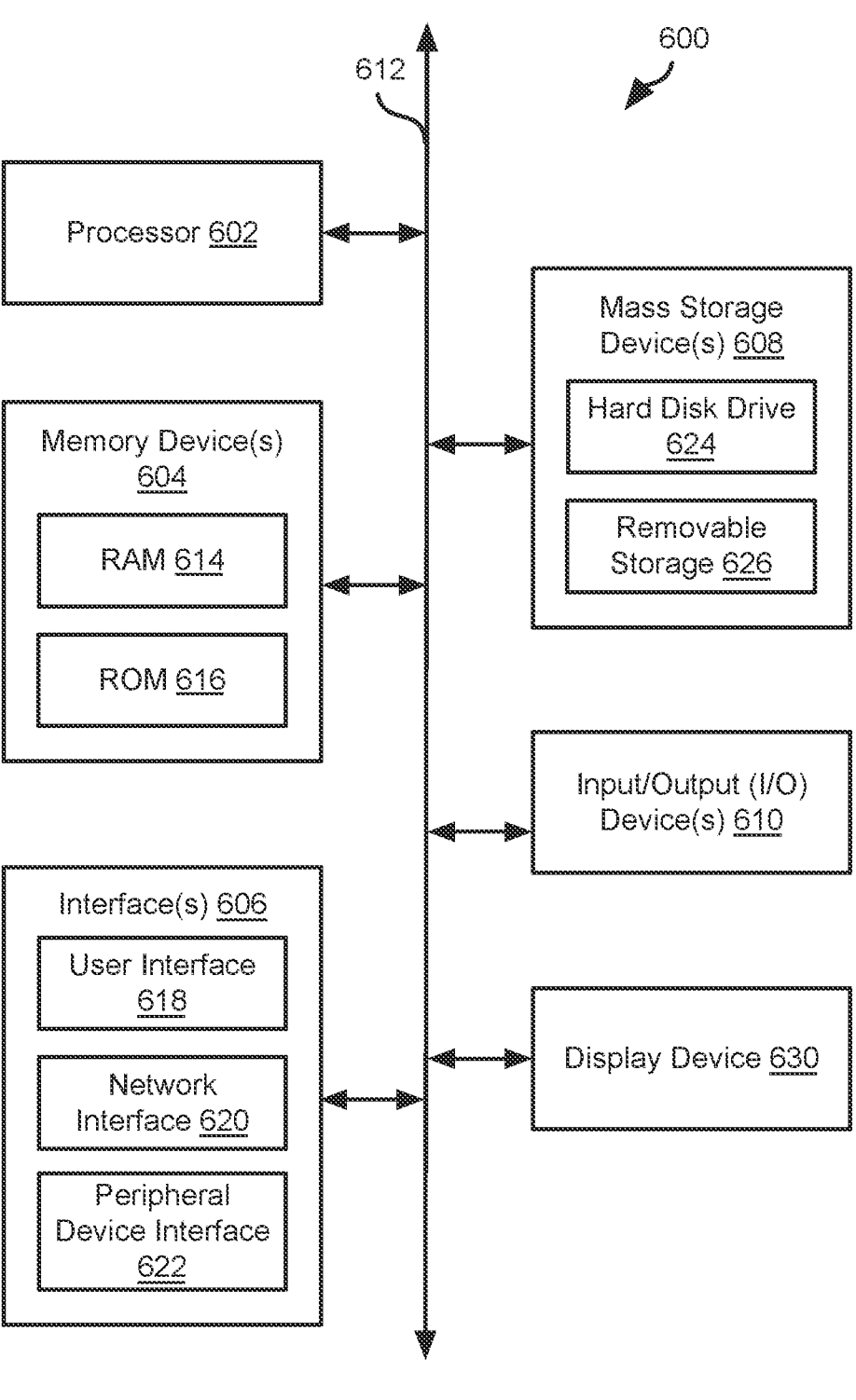
FIG. 6 is a schematic block diagram of an example computing device suitable for implementing methods in accordance with embodiments of the invention.

FIG. 6 is a block diagram illustrating an example computing device 600. Computing device 600 may be used to perform various procedures, such as those discussed herein. The servers 102, orchestrator 106, workflow orchestrator 122, and cloud computing platform 104 may each be implemented using one or more computing devices 600. The orchestrator 106, and workflow orchestrator 122 may be implemented on different computing devices 600 or a single computing device 600 may execute both of the orchestrator 106, and workflow orchestrator 122.

Computing device 600 includes one or more processor(s) 602, one or more memory device(s) 604, one or more interface(s) 606, one or more mass storage device(s) 608, one or more Input/output (I/O) device(s) 610, and a display device 630 all of which are coupled to a bus 612. Processor(s) 602 include one or more processors or controllers that execute instructions stored in memory device(s) 604 and/or mass storage device(s) 608. Processor(s) 602 may also include various types of computer-readable media, such as cache memory.

Memory device(s) 604 include various computer-readable media, such as volatile memory (e.g., random access memory (RAM) 614) and/or nonvolatile memory (e.g., read-only memory (ROM) 616). Memory device(s) 604 may also include rewritable ROM, such as Flash memory.

Mass storage device(s) 608 include various computer readable media, such as magnetic tapes, magnetic disks, optical disks, solid-state memory (e.g., Flash memory), and so forth. As shown in FIG. 6, a particular mass storage device is a hard disk drive 624. Various drives may also be included in mass storage device(s) 608 to enable reading from and/or writing to the various computer readable media. Mass storage device(s) 608 include removable media 626 and/or non-removable media.

I/O device(s) 610 include various devices that allow data and/or other information to be input to or retrieved from computing device 600. Example I/O device(s) 610 include cursor control devices, keyboards, keypads, microphones, monitors or other display devices, speakers, printers, network interface cards, modems, lenses, CCDs or other image capture devices, and the like.

Display device 630 includes any type of device capable of displaying information to one or more users of computing device 600. Examples of display device 630 include a monitor, display terminal, video projection device, and the like.

Interface(s) 606 include various interfaces that allow computing device 600 to interact with other systems, devices, or computing environments. Example interface(s) 606 include any number of different network interfaces 620, such as interfaces to local area networks (LANs), wide area networks (WANs), wireless networks, and the Internet. Other interface(s) include user interface 618 and peripheral device interface 622. The interface(s) 606 may also include one or more peripheral interfaces such as interfaces for printers, pointing devices (mice, track pad, etc.), keyboards, and the like.

Bus 612 allows processor(s) 602, memory device(s) 604, interface(s) 606, mass storage device(s) 608, I/O device(s) 610, and display device 630 to communicate with one another, as well as other devices or components coupled to bus 612. Bus 612 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 600, and are executed by processor(s) 602. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An apparatus comprising:
a computing device including one or more processing devices and one or more memory devices operably coupled to a plurality of processing devices, the one or more memory devices storing executable code that, when executed by the one or more processing devices, causes the one or more processing devices to:
detect that a plurality of hosts lack processing units available for allocation; and
in response to detecting that the plurality of hosts lack processing units available for allocation:
select a selected host of the plurality of hosts; and
invoke instantiation of a first component using one or more previously-allocated processing units of the selected host that were previously dedicated to a second component by:
adding the one or more previously-allocated processing units to a shared set of processing units;
instantiating the first component on the selected host; and
binding the first component to the one or more previously-allocated processing units such that both of the first component and the second component are bound to the one or more previously-allocated processing units.

2. The apparatus of claim 1, wherein the executable code, when executed by the plurality of processing devices, causes the one or more processing devices to select the selected host according to an affinity requirement for the first component.

3. The apparatus of claim 1, wherein the executable code, when executed by the plurality of processing devices, causes the one or more processing devices to select the selected host according to an anti-affinity requirement for the first component.

4. The apparatus of claim 1, wherein the executable code, when executed by the plurality of processing devices, causes the one or more processing devices to select the selected host according to a latency requirement for the first component.

5. The apparatus of claim 1, wherein the first component is a container.

6. The apparatus of claim 1,
wherein the executable code, when executed by the plurality of processing devices, causes the one or more processing devices to select the selected host in response to detecting failure of a host of the plurality of hosts executing a third component.

7. The apparatus of claim 1, wherein the executable code, when executed by the plurality of processing devices, causes the one or more processing devices to invoke instantiation of the first component by a KUBERNETES Kubelet.

8. The apparatus of claim 1, wherein the one or more previously-allocated processing units belong to a plurality of processing units of the selected host.

9. The apparatus of claim 8, wherein the plurality of processing units are a plurality of processor cores on a common chip.

10. A method comprising:
detect, by a computer system, that a plurality of hosts lack processing units available for allocation; and
in response to detecting that the plurality of hosts lack processing units available for allocation:
selecting, by the computer system, a selected host of the plurality of hosts; and
invoking, by the computer system, instantiation of a first component using one or more previously-allocated processing units of the selected host that were previously dedicated to a second component by:
adding the one or more previously-allocated processing units to a shared set of processing units;
instantiating the first component on the selected host; and
binding the first component to the one or more previously-allocated processing units such that both of the first component and the second component are bound to the one or more previously-allocated processing units.

11. The method of claim 10, further comprising selecting, by the computer system, the selected host according to an affinity requirement for the first component.

12. The method of claim 10, further comprising selecting, by the computer system, the selected host according to an anti-affinity requirement for the first component.

13. The method of claim 10, further comprising selecting, by the computer system, the selected host according to a latency requirement for the first component.

14. The method of claim 10, wherein the first component is a container.

15. The method of claim 10, further comprising:
selecting, by the computer system, the selected host in response to detecting failure of a host of the plurality of hosts executing a third component.

16. The method of claim 10, further comprising invoking, by the computer system, instantiation of the first component by a KUBERNETES Kubelet.

17. The method of claim 10, wherein the one or more previously-allocated processing units belong to a plurality of processing units of the selected host.

18. The method of claim 17, wherein the plurality of processing units are a plurality of processor cores on a common chip.

* * * * *